June 9, 1953     J. C. BECKMAN ET AL     2,641,523
PHOTOGRAPHIC TIME RECORDING
Filed Aug. 11, 1947
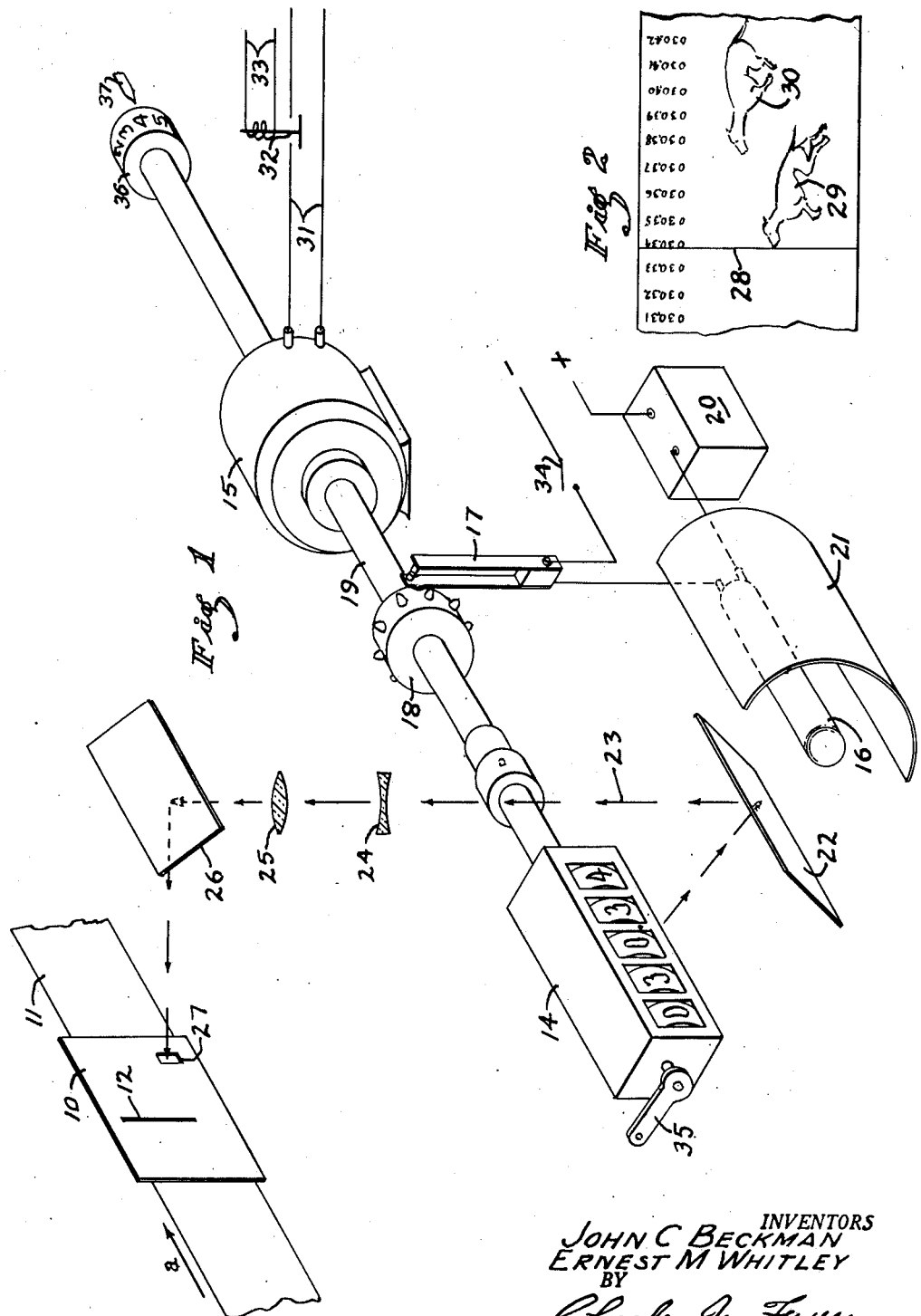
INVENTORS
JOHN C BECKMAN
ERNEST M WHITLEY
BY
Charles M Fryer
ATTORNEY Patented June 9, 1953

2,641,523

UNITED STATES PATENT OFFICE 2,641,523

PHOTOGRAPHIC TIME RECORDING

John C. Beckman and Ernest M. Whitley, San Mateo, Calif., assignors to Beckman & Whitley, Inc., San Carlos, Calif., a corporation of California Application August 11, 1947, Serial No. 768,010

2 Claims. (Cl. 346—107)

This invention relates to photographic time recording and particularly to the exposure on film of numerals indicating the passage of time together with a photographic record of events elapsing during such time. The invention is applicable to various fields, but is in use and will be described herein in connection with its application to the recording and timing of the finish of a race, such for example as a horse or dog race.

One type of photography now used for recording the finish of a race, and that has many advantages over the conventional motion picture photography, is the strip film method. In this method, a strip of film is exposed to the objective through a narrow vertical slit. The strip is drawn past the slit at the same speed as the movement of the image of the objective to be recorded. Consequently, the exposure on the strip is a representation of the objective exposed on the film progressively as the film passes the slit and the objective passes the field upon which the slit, with suitable lenses, is focused. In operation the slit camera is set up at the finish line of a race track and focused across the track at the finish line to expose a length of film corresponding to only a few inches of track on the side of the line adjacent to and beyond the finish line. As the entries in the race approach the line the strip is started in motion so that it passes the slit at a speed corresponding to the speed that the entries are crossing the line, taking into consideration the object image ratio, which in practice may be about 150 to 1. While in practice the photographic record so made may be slightly distorted, particularly as to length, it is faithful as to relative front end or nose positions of the entries with respect to the finish line and with respect to each other.

It is an object of the present invention to provide a method and apparatus for applying a photographic record of a timing device on a strip film made in the manner described and correlated with the entries photographed thereon in a manner to indicate clearly and accurately the exact running time of each entry from start to finish of the race. Other objects and advantages of the invention and the manner in which it is carried out will be made apparent in the following specification wherein reference is made to the accompanying drawings.

In the drawings:

Fig. 1 is a diagrammatic view of apparatus employed for carrying out the present invention; and Fig. 2 is an elevation of a small section of a film strip that has been exposed.

In Fig. 1 a portion of a strip film type recording device is shown as a mask 10 overlying a film strip 11 and having a slit 12 to expose the strip progressively throughout its length as it moves behind the mask in the direction of the arrow "a." The film is, of course, enclosed in a camera-like box (not shown) and suitable lenses are employed, but this mechanism is conventional and does not form a part of this invention.

A numerical counter 14 is driven by a constant speed motor 15 at a rate to indicate time in hundredths of seconds. The motor is energized or started in motion at the start of the race, and assuming that the counter was set at zero its reading at any time will indicate the time elapsed since the start of the race. The counter is of conventional construction, being made up of cylindrical numbered dials in which one complete revolution of the digit dial is translated to effect a tenth revolution to the tens dial, and one complete revolution of the tens dial is translated to a tenth revolution of the hundredths dial, etc.

Because the numbered dials which make up the counter are in constant motion, the faster or units dial is moving at a speed of ten revolutions per second, and because the film strip is also moving continuously during the exposure at say 3 inches per second, the reading of the counter cannot be recorded on the film in a conventional manner. Instead the counter is maintained within the total darkness of the enclosing case (not shown) and is illuminated periodically in timed relation to its operation so that its image is recorded on the film each time that a new number is exposed and attains a position of alignment with the other numbers. The illumination is accomplished by a lamp 16 energized by a circuit including a switch 17 adapted to be closed at properly timed intervals by ten equally spaced lobes on a cam 18 carried and rotated by a shaft 19, which shaft forms the driving connection between the motor 15 and the indicator 14.

The lamp 16 is of the stroboscopic type and is in circuit with a conventional stroboscopic capacitator 20 of conventional design. The total period of illumination of a lamp of this character is about 10 to 50 microseconds, or 1/100,000 to 5/100,000 second. Such periodic illumination occurs each time that the switch 17 is closed by one of the lobes of the cam 18. Consequently, though the film 11 and the time registering device 14 are both in motion, the time of illuminated exposure of the number appearing on the registering device is so short that any distortion in the photographic recording of the number will be so minute that it may be disregarded and the recording of the number on the film will be distinct for all practical purposes.

A reflector 21 of curved shape is preferably disposed behind the lamp 16 for concentrating its rays on the face of the time registering device. In order to expose the film to the numerical reading an inclined mirror 22 is placed in front of the registering device and reflects the numbered face thereof along the line of arrows indicated at 23 through suitable lenses 24 and 25, then against a mirror 26, which directs the image to an opening 27 formed in the mask 10 for exposing that area of the film upon which the numbers are to be recorded in timed relation to the exposure of the race entries through the slit 12.

Ordinarily it is to be expected that if the numerals indicating the time are to be compared with the passage of the entries over the finish line exposed through the slit 12, the opening 27 should be in vertical alignment with the slit 12. It is found, however, that when the motor 15 is energized at the start of a race some lag in time takes place as the motor comes up to full speed. According to the present invention this lag may be determined and the distance on the film may be calculated to correspond to this lag and compensate it by exposing the time on the film a short distance in space in advance of the actual exposure of the finish line through the slit 12. Thus the true time that an entry reaches the finish line is indicated by a number representing seconds and hundredths of seconds on a vertical line superimposed on the film, as indicated at 28 in Fig. 2, wherein the nose of the first entry 29 is shown touching the line and the time 30.34 seconds is indicated as the elapsed time from the start of the race to the finish for this entry.

Other means may be employed to compensate the starting lag of the motor 15, such, for example, as a numbered hand wheel 36 fixed to the shaft of the motor 15 for rotating the shaft by hand and consequently rotating the dials of the counter device 14. A reference pointer 37 is employed adjacent the hand wheel 36 and before the race is started and the motor set in operation the hand wheel is turned to adjust the counting device or to advance it a distance sufficient to compensate for the starting lag of the motor. If this system is employed, the opening 27 through which the time is exposed on the film may be made directly in line with the slit 12 or, in fact, may be an extension of the lower end of this slit. Where the motor lag is known and is known not to vary, it is possible to eliminate the hand wheel 36 and to renumber the first dial or dials of the counter 14 in such a manner that when the counter is set to zero position it will exhibit a number corresponding to the time of the motor lag. Thus, in operation the motor lag will be compensated by the artificial pre-numbering of the dials in the counter, and in this method the numbers on the counter may also be exposed on the film in direct alignment with the slit 12.

Another line, such as that indicated at 28, superimposed on the nose of the second entry 30 would indicate the exact time in which the second entry finished the race because time is repeatedly shown on the film strip in hundredths of seconds.

In operation the motor 15 is started at the time that the race is started. As the start of the race is usually indicated by some electrical means, the motor circuit 31 may include an electromagnetically actuated switch 32 energized by a circuit 33, which circuit is a part of the race starting circuit (not shown). A switch 34 in the light circuit is preferably closed a few seconds in advance of the actual use of the light to provide a warming-up period. Next, and just before the entries reach the finish line, the camera is started to effect movement of the film 11 in the direction of the arrow "a" at proper speed. After the entries have crossed the finish line so that they have been exposed on the film together with the numerical time record, the camera, motor and light are all de-energized and before the next race the counter 14 may be set to zero by manipulation of a conventional zeroizing lever 35 or by the same means may be set to display its compensating figure if renumbering of the counter has been employed as a means of compensating motor lag.

One of the several advantages of this method of recording time on a film is that it is accomplished without the use of a shutter and thus eliminates the necessity of moving parts operating at a speed of 100 cycles per second. Another advantage of this invention is that it displays the time on the film in easily read arabic numbers representing time in hundredths of seconds and thus eliminates the use of vernier scales and symbols which are difficult to read.

We claim:

1. An apparatus for photographically recording time on the film of a strip film camera wherein the image of a moving object is exposed on a moving film through a slitted mask which comprises a counting device, a motor for driving said device to effect the display thereon of numerals corresponding to time intervals, means for illuminating the counting device periodically with said time intervals to effect exposure thereof on the film, means for starting the timing device from zero position with the start of a race whereby the finish of the race exposed on the film will be accompanied by a record of the time, and means for projecting the image of the counting device onto the film at a point spaced from the slit in said mask to compensate starting lag in the motor and align the time record with the image of the moving object on the film.

2. An apparatus for photographically recording time on the film of a strip film camera which comprises a counting device, a motor for driving said device to effect the display thereon of numerals corresponding to time intervals, means for projecting an image of said numerals onto the film, means for illuminating the counting device periodically with said time intervals to produce exposure thereof on the film, means for starting the timing device with the start of a race whereby the finish of the race exposed on the film will be accompanied by a record of the accumulated time since the start, and means for compensating the starting lag of the timing device.

JOHN C. BECKMAN.
ERNEST M. WHITLEY.

References Cited in the file of this patent

UNITED STATES PATENTS

| Number | Name | Date |
|---|---|---|
| 1,913,200 | Hathaway | June 6, 1933 |
| 2,257,100 | Belock | Sept. 30, 1941 |
| 2,320,350 | Del Riccio | June 1, 1943 |
| 2,427,355 | Keinath | Sept. 16, 1947 |